Figure 1:
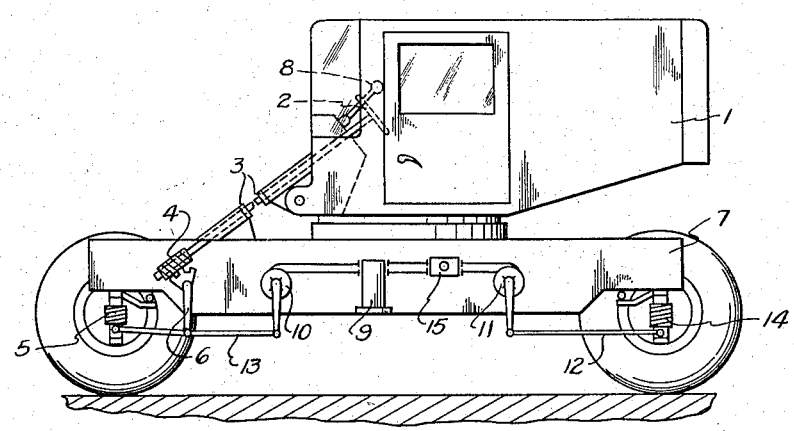

Feb. 24, 1959    H. SCHEUERPFLUG    2,874,792
COMBINATION MANUAL AND POWER STEERING MEANS
WITH DISENGAGING CLUTCH FOR MANUAL MEANS
Filed July 30, 1956

INVENTOR
Hans Scheuerpflug

BY
Bailey, Stephens & Huettig
ATTORNEYS

United States Patent Office 2,874,792
Patented Feb. 24, 1959

2,874,792

COMBINATION MANUAL AND POWER STEERING MEANS WITH DISENGAGING CLUTCH FOR MANUAL MEANS

Hans Scheuerpflug, Nurnberg, Germany, assignor to Maschinenfabrik Augsburg-Nurnberg, A. G., Nurnberg, Germany Application July 30, 1956, Serial No. 601,083

1 Claim. (Cl. 180—79.2)

This invention relates to a crane steering means for a rotatable self-propelled crane.

The object of the invention is to produce a steering system for a self-propelled crane which will meet the requirements for driving on highways as well as the steering requirements required at the sites where the crane is being used.

Ordinarily, self-propelled rotary cranes have a manual mechanical steering system which passes through the axis of the crane turntable by means of shafts, beveled wheels, or sprocket wheels. Steering systems have also been constructed which are operable only when the crane housing or chassis is in a certain position in respect to the vehicle frame, the steering gear extending through the turntable. Such steering gear is unsatisfactory in that it has too much play, and the steering is impaired when the crane is driven rapidly in a straight direction.

The play in the steering in a system having auxiliary power steering for bolstering the manual steering is also disadvantageous. For example, a compressed air or hydraulic power steering mechanism has a quicker and more accurate response as compared to manual steering gear. In self-propelled rotary cranes, steering systems actuated by compressed air, electricity, or combined hydraulic and compressed air have been used with the supply lines passing through the turntable by means of so-called rotor terminals or collector ring members, respectively. At certain speeds, however, such steering systems are not sufficiently accurate, and the vehicle will swerve.

These difficulties are avoided by this invention by providing the crane with a manual steering mechanism for driving on a road, with an additional power steering means for use at construction sites. This power steering can be operated hydraulically by compressed air, by combined hydraulic and compressed air, or by electricity.

The manual steering mechanism is disconnectable and arranged so that it can be connected only when the crane housing is in its normal driving position.

The disconnecting means for the manual steering can also be combined with the operating controls for the various vehicle accessories such as the headlights, stop lights, hand brakes, and the like.

Preferably, the disconnecting means is composed of a clutch contained in the steering column between the portion of the column in the crane housing and the portion of the column in the vehicle frame. This clutch can further constitute a means for locking the housing into its driving position upon the frame.

The power steering system is arranged so that it is connected to the front and rear axles through two separate steering linkages. The front and rear axles can be turned either in the same or opposite directions. Furthermore, the wheels can be separately steered, and one set of wheels locked while steering with the other set of wheels. Also, the power steering can be coupled to the manual steering.

Figure 2:
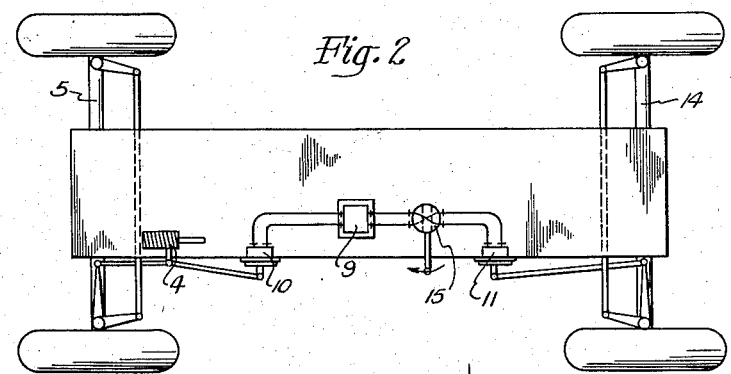
Figure 3:
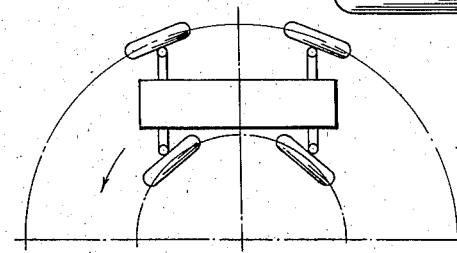
Figure 4:
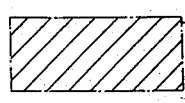

The means by which the objects of the invention are obtained are described more fully with reference to the accompanying drawings, in which:

Figure 1 is a side elevational view of the crane;
Figure 2 is a bottom plan view of Figure 1;
Figure 3 is a diagrammatic view of the crane wheels turned in opposite directions; and
Figure 4 is a similar view showing the wheels turned in the same direction to approach a work site.

The crane housing or upper chassis 1 contains a manual steering wheel 2. In the normal driving position of the housing, the steering column for wheel 2 is connected by means of clutch 3 with the steering gear 4 which operates the steering linkage for the wheels on front axle 5, the connection being through steering finger 6. Clutch 3 also functions as a means for locking housing 1 into its normal driving position upon vehicle frame 7.

A compressed air or hydraulic power steering mechanism is provided for steering the crane at a construction site. Clutch 3 is first disconnected so that housing 1 can rotate freely upon frame 7. Lever 8 in housing 1 controls the source 9 of compressed air, which air is passed through suitable pipes to rotary piston cylinders 10 and 11. Cylinder 11 is connected by steering linkage 12 to the steering rods on axle 14. Cylinder 10 is joined by steering linkage 13 to the steering rods for front axle 5 and to steering finger 6. Control valve 15 mounted in the compressed air pipes leading from source 9 functions to reverse the flow of air so that the front and rear wheels can be positioned in either the same or opposite directions. When the wheels are in opposite directions, as in Figure 3, a very small turning radius is obtained. By placing the wheels in the same direction, as in Figure 4, the vehicle can move lateral to its longitudinal axis, so that it can be steered close to a load 16.

By closing one of the pipe lines extending from source 9 to cylinder 10 or 11, the steering linkage for one axle can be locked so that the vehicle is solely steered by the wheels on the other axle.

Inasmuch as front axle steering linkage 13 is connected to the manual steering means through finger 6, the power steering mechanism can be used to supplement the manual steering through steering wheel 2.

Having now described the means by which the objects of the invention are obtained, I claim:

A self-propelled crane comprising a vehicle frame, front and rear axles and wheels secured to said frame, a rotatable crane housing carried by said frame, power driven steering means mounted on said frame beneath the turning plane of said housing and connected to said wheels for steering the crane while located on a construction site, mechanical linkage steering means carried by said frame and connected to the wheels of the front axle, a manually operated steering column mounted in said housing and obliquely inclined toward the front wheels for steering the crane on a highway, a clutch connecting said steering column with said mechanical linkage steering means, and means connecting said power driven steering means to said mechanical linkage steering means for supplementing the steering of the front wheels.

References Cited in the file of this patent

UNITED STATES PATENTS

| 1,845,161 | Lewis | Feb. 16, 1932 |
| 2,148,308 | Spear | Feb. 21, 1939 |
| 2,202,676 | Towson | May 28, 1940 |
| 2,421,139 | Barnhart | May 27, 1947 |
| 2,548,949 | Collinder | Apr. 17, 1951 |
| 2,650,100 | Ronning | Aug. 25, 1953 |
| 2,674,333 | Zeilman et al. | Apr. 6, 1954 |

FOREIGN PATENTS

| 745,519 | Great Britain | Feb. 29, 1956 |